United States Patent [19]

Helmer et al.

[11] 3,940,519
[45] Feb. 24, 1976

[54] PROCESS FOR SIZING CELLULOSE FIBRES

[75] Inventors: Karin Ulla Elisabet Helmer; Berit Ingegärd Simonsson, both of Solna, Sweden

[73] Assignee: Kemanord AB, Stockholm, Sweden

[22] Filed: May 15, 1974

[21] Appl. No.: 469,977

[30] Foreign Application Priority Data
May 15, 1973 Sweden............................... 7306875
May 15, 1973 Sweden............................... 7306876
Mar. 13, 1974 Sweden............................... 7403374

[52] U.S. Cl............ 427/395; 162/175; 260/233.3 R
[51] Int. Cl.². C08B 19/06; D21D 3/00; D21D 3/20
[58] Field of Search....... 260/233.3 R; 117/139.5 C, 117/143 R; 427/395; 162/175

[56] References Cited
UNITED STATES PATENTS
3,634,395 1/1972 Walon......................... 117/139.5 C
3,639,389 2/1972 Hull............................. 117/139.5 C Primary Examiner—Michael R. Lusignan
Attorney, Agent, or Firm—Fred Philpitt

[57] ABSTRACT

The present invention relates to a process for sizing cellulose fibers or cellulose fiber-containing materials by using modified starch containing hydrophobic groups having the general formula

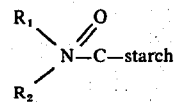

wherein $R_1$ is an organic, hydrophobic hydrocarbon group having 8–40 carbon atoms and $R_2$ is a $C_1$–$C_8$ alkyl group or has the same meaning as $R_1$.

8 Claims, No Drawings

PROCESS FOR SIZING CELLULOSE FIBRES

BACKGROUND

Cellulose fibers or cellulose fiber containing materials are usually made hydrophobic (or "sized") with rosin. With internal sizing an emulsion of saponified rosin is added to the cellulose fibers dispersed in the stock together with alum for precipitation of the rosin on the fibers. This limits the choice of the pH of the pulp, since the precipitation of rosin must occur in an acid medium. These sizing systems are sensitive to high temperatures and consequently problems do often arise in modern paper making machines with closed white water systems.

Another type of sizing agent, the synthetic internal sizes, have recently begun to come into more extensive use. One advantage of these is that the pH-dependence during the sizing has been eliminated thereby making sizing possible in a neutral system. This improves the tensile properties of the finished paper. These synthetic internal sizes must be added in the form of water dispersions and a great problem with these is that up to the present there have been difficulties in producing dispersions with sufficiently good storage stability. The dispersions may for example coagulate or the sizing agent may be hydrolyzed.

The synthetic internal sizes consist of compounds containing a group, e.g. a ketene dimer, an anhydride, an acid chloride or a carbamoyl chloride group, which is capable of reacting with the hydroxyl groups of the cellulose fiber to form an irreversible bond.

Since the hydrophobic effect is obtained after a chemical reaction between the sizing agent and the cellulose fiber there is a great demand for proper dosage and for the maintaining of suitable reaction conditions.

Starch is used in many cases during paper making. By incorporation of starch in the pulp the mechanical strength of the paper is improved. The polar hydroxyl groups of the starch form cellulose fiber-starch-cellulose fiber bonds and thereby the dry strength of the paper is increased.

THE PRESENT INVENTION

According to our invention it has been found that if a modified starch is used as sizing agent for cellulose fibers or cellulose fiber-containing materials (which starch is modified before the actual sizing step by reaction with a carbamoyl chloride substituted with at least one hydrophobic hydrocarbon group) the resulting cellulose fiber or cellulose fiber-containing material will have at least as good hydrophobic properties as if a synthetic internal size had been used.

One advantage of our process is that the starch can be modified under carefully controlled conditions outside the actual paper making process.

Another advantage is that the modified starch can be added in a simple manner to the fiber pulp without preceding dispersion problems, which facilitates the handling of the sizing agent and also means that the sizing agent easily can be produced by the paper manufacturer.

An additional advantage of very great importance is that by using modified starch according to our invention it is possible to add to the pulp in one single operation both a sizing agent and a material for improving the mechanical properties of the finished paper.

The modified starch derivatives used according to our invention are suitable not only for stock additions but can furthermore be used as surface sizing agents or surface modifying agents. It is known that the presence of hydrophobic groups can prevent hydrogen bonds, thus reducing the strength of the finished paper. It was therefore quite surprising that the hydrophobic groups in the starch derivatives according to our invention would be oriented in such a way as to confer to the paper good hydrophobic properties while they do not affect the strength of the paper.

THE MODIFIED STARCH DERIVATIVES

The modified starch derivatives which we contemplate bringing into contact with cellulose fibers or cellulose fiber containing materials for the purpose of sizing have the general formula:

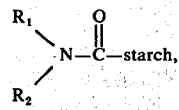

wherein $R_1$ is an organic, hydrophobic hydrocarbon group having 8–40 carbon atoms and $R_2$ is a $C_1$–$C_8$ alkyl group or has the same meaning as $R_1$.

The organic, hydrophobic groups $R_1$ and $R_2$ which have been found to confer to the starch properties suitable for sizing of cellulose fiber materials are those in which the hydrophobic group is a higher alkyl having at least about 8 carbon atoms, e.g. decyl, undecyl, dodecyl, tridecyl, tetradecyl, pentadecyl, hexadecyl, heptadecyl, octadecyl, tetracosyl and pentacosyl and higher alkyl up to about 40 carbon atoms, if desired, although those having about 12–30 carbon atoms are preferred; the corresponding alkenyl groups having from about 8 to about 40 carbon atoms, among which as examples can be mentioned decenyl, tridecenyl, heptadecenyl, octadecenyl, eicosenyl, tricosenyl, etc.; aralkyl, alkaryl, and alkyl substituted cycloalkyl having at least about 8 carbon atoms for example 4-tert.-butylphenyl, octylphenyl, dinonylphenyl, dodecylphenyl, tridecylphenyl, pentadecylphenyl, octadecylphenyl, heneicosylphenyl, nonylcyclopropyl, dodecylcylobutyl, tridecylcyclopentyl, tetradecylcyclohexyl, pentadecylcyclohepthyl, octadecylcylohexyl etc., and any of these alkyl, alkenyl, alkaryl and alkylcycloalkyl groups containing non-disturbing inert substituents. Among inert substituents can be mentioned carboalkoxy, alkyloxy, aryloxy, arylalkyloxy etc. Among examples of radicals which should not be present to any larger extent in the hydrophobic group hydroxyl groups, primary and secondary amino groups, amide groups containing amide hydrogen and carboxyl groups or other acid groups can be mentioned. It is obvious to persons skilled in the art which groups can be used in these compounds if undesired side reactions are to be avoided.

It is not necessary that both $R_1$ and $R_2$ be hydrophobic groups. It is within the scope of the invention that one of the substituents can consist of a group containing less than 8 carbon atoms, e.g. a lower alkyl group, a (lower) cycloalkyl group or a phenyl group. Suitably $R_1$ is an alkyl group having 12 to 30 carbon atoms and $R_2$ is a lower alkyl group having 1–8 carbon atoms or has the same meaning as $R_1$, and preferably $R_1$ and $R_2$ are both an alkyl group having 12–30 carbon atoms.

PREPARATION OF MODIFIED STARCH DERIVATIVES

The modified starch derivatives used as sizing agents according to the invention are prepared by reacting starch and carbamoyl chloride which contains the above described groups $R_1$ and $R_2$.

According to one method of preparation an aqueous slurry of starch is brought into contact with the carbamoyl chloride, which can either be dispersed in a suitable way or can be added in solid form, preferably in the form of powder, to a warm starch solution. When the carbamoyl chloride is added to the starch in dispersed form a cationic dispersing agent is suitably used, e.g. quarternary amines or amine hydrochlorides.

Carbamoyl chlorides contain the reactive group, $>$N-COCl, which can react with the hydroxyl groups of the starch. Owing to the high reactivity of the carbamoyl chloride with the starch the modification can be carried out in a simple way at the paper mills. The modification can for example be accomplished in connection with the warming of the starch at about 80–120°C for its gelatinization before the addition to the paper or the pulp. The reactivity of carbamoyl chlorides is somewhat enhanced if an alkyl chloroformate or an alkyl isocyanate is present during the reaction. In that case the alkyl chain preferably has 8 to 20 carbon atoms.

The amount of carbamoyl chloride relative to the starch can be varied within wide limits. When using the modified starch as a surface size the starch preferably contains 0.05–10% by weight of carbamoyl chloride based on the weight of the dry starch. Starch modified with this amount of carbamoyl chloride is also very suitable for use in internal sizing of cellulose fibers where large amounts of starch normally are added in order to confer to the finished paper desired physical strength properties, e.g. when making kraft paper. Starch modified in this way is also suitable in the production of paperboard, cardboard, mineral board, etc.

On the other hand when making printing paper, where small amounts of starch normally are used, it is advantageous to use starch containing a larger amount of carbamoyl chloride. Internal sizing can thus be carried out with starch containing 10–50% by weight of carbamoyl chloride, preferably 10–30% by weight, based on the weight of the starch. Good hydrophobing of the finished paper is thus obtained without the need of unnecessary high amounts of starch.

As examples of starch which can be used as sizing agents in modified form according to the present process can be mentioned: native starch, such as potato starch, maize starch, tapioca starch etc., refined starch, such as amylose starch and etherified starch or starch which has been reacted with different cationic agents, e.g. diethylaminoethylchloride hydrochloride, glycidyltrimethyl ammonium chloride, phosphonium- or sulphoniumcompounds. The starch can be presented in gelatinized form or non-gelatinized form.

When carrying out our process the modified starch derivatives are brought into contact with the cellulose fibers or cellulose fiber-containing materials in a manner known per se. The starch derivatives in water solution can for example be added to a water suspension of cellulose fibers, so-called stock addition, or paper can be surface sized with a solution of the starch derivatives.

The starch derivatives are used in an amount exceeding 0.01% by weight based on dry fibers at internal or surface sizing. The upper limit is not critical but is primarily limited by economical considerations. The amount of starch derivative is naturally related to the amount of carbamoyl chloride present in the starch. Consequently, a smaller amount of starch derivative can be used when the starch is substituted with high amounts of carbamoyl chloride, while a higher amount of starch derivative based on cellulose fibers must be incorporated for achieving a desired hydrophobic effect when the degree of carbamoyl substitution is low. Generally the amount of starch derivative is within the range of from 0.01 to 5% by weight, based on dry fibers, and preferably 0.05 to 5% by weight and most preferably 0.05–2% by weight at paper making, while in the production of mineral boards 5 to 20% by weight based on dry fibers can be used.

The suspension of cellulose fibers can contain other additives useful in paper making, production of board, cardboard etc. such as alum, fillers, pigments, retention agents, antifoam agents, etc.

The invention is described in greater detail in the following examples, which, however, are not intended to limit the scope of the invention. Percentages and parts relate to percent by weight and parts by weight, unless otherwise indicated.

EXAMPLE 1

Distearyl carbamoyl chloride was prepared by charging 2.1 kg of toluene into a flask and then simultaneously adding 1.8kg of melted distearyl amine and 0.5 kg of phosgene under agitation at 55°–60°C. The temperature was then raised to 100°C. The reaction was carried out under slight vacuum and reflux. When the conversion was almost 100%, corresponding to a yield of about 1.8 kg distearyl carbamoyl chloride, toluene and phosgene were evaporated.

EXAMPLE 2

In a flask were mixed at room temperature 12.5 g of potato starch and 150 ml of water whereafter a dispersion of 1.12 g of distearyl carbamoyl chloride in 100 ml of water was added. The temperature was raised to 90°C for two hours, the mixture then being cooled. The nitrogen content was determined according to Kjelldahl and corresponded to a conversion of 83%.

EXAMPLE 3

The preparation procedure according to Example 2 was repeated with cationic starch. Instead of the above given amounts 1.69 g of distearyl carbamoyl chloride and 0.19 g of cetyl chloroformate in 100 ml of water were added. The nitrogen content was determined according to Kjelldahl, and corresponded to a conversion of 80%.

EXAMPLE 4

The preparation procedure of Example 3 was repeated. Instead of the above given amounts 2.26 g of distearyl carbamoyl chloride and 0.25 g of cetyl chloroformate in 100 ml of water were added. The nitrogen content according to Kjelldahl was determined and corresponded to a conversion of 70%.

EXAMPLE 5

This example was carried out in accordance with Example 2 but without addition of distearyl carbamoyl chloride.

EXAMPLE 6

This example was carried out according to Example 3 but without addition of distearyl carbamoyl chloride and cetyl chloroformate.

EXAMPLE 7

5% water solutions were made from the starch derivatives according to the Examples 2–6. These solutions were added to a suspension of cellulose fibers in water. Paper sheets were formed in a laboratory sheet machine. The sheets were dried for 40 minutes at 60°C and cured for 30 minutes at 105°C. After conditioning for 4 hours at 20°C and 65% relative humidity the Cobb number according to TAPPI Standard T 444M-60 was determined. Unmodified starch was used as a reference. The results are shown in Table 1.

EXAMPLE 9

The preparation procedure of Example 8 was repeated. Instead of above given amounts 6.25 g of distearyl carbamoyl chloride were added. The nitrogen content determination corresponded to a conversion of 67% for a sample taken after three hours.

EXAMPLE 10

The preparation procedure of Example 8 was repeated with an alkaline buffer solution, pH 8–9. Samples were taken after 3 and 24 hours respectively, at 90°C. The nitrogen determination corresponded to conversions of 65% and 68% respectively.

EXAMPLE 11

The preparation procedure of Example 10 was re-

Table 1

| Sample according to ex. number | 2 | 2 | 3 | 3 | 3 | 4 | 4 | 5 | 6 | 6 | Reference (without addition of starch) |
|---|---|---|---|---|---|---|---|---|---|---|---|
| Added starch in % of dry fibre weight | 1.0 | 1.0 | 1.0 | 0.75 | 0.50 | 1.0 | 1.0 | 1.0 | 1.0 | 0.75 | — |
| pH of the pulp | 7 | 7 | 7 | 7 | 7 | 7 | 5 | 7 | 7 | 7 | 7 |
| Pulp temperature °C | 20 | 45 | 20 | 20 | 20 | 20 | 20 | 20 | 20 | 20 | 20 |
| Cobb number g/m$^2$ | 60.0 | 25.0 | 20.5 | 20.7 | 21.0 | 17.1 | 18.0 | >130 | >130 | >130 | >130 |
| Dry tensile strength km | 5.25 | 5.42 | 5.44 | 5.23 | 5.10 | 5.73 | 5.82 | 4.20 | 5.56 | 5.05 | 4.00 |
| Burst factor | 56.0 | 56.0 | 52.0 | 49.6 | 48.3 | 51.1 | 53.7 | 45.0 | 58.6 | 50.2 | 41.3 |
| % distearyl carbamoyl chloride based on the amount of starch | 9 | 9 | 14 | 14 | 14 | 18 | 18 | — | — | — | — |

EXAMPLE 8

In a flask were mixed at room temperature 12.5 g of cationic starch and 250 ml of H$_2$O, whereafter 1.88 g of distearyl carbamoyl chloride in pulverised form were added. The temperature was raised to 90°C. Samples were taken after 2 and 4 hours respectively and were cooled. The nitrogen contents were determined according to Kjelldahl and corresponded to conversions of 75.0% and 80% respectively.

peated. Instead of the above given amount of distearyl carbamoyl chloride 2.5 g were added. A sample was taken after 4 hours, the nitrogen content corresponding to a conversion of 70%.

EXAMPLE 12

The preparation of Example 10 was repeated. Instead of above given amount of distearyl carbamoyl chloride 4.38 g were added. A sample was taken after 3 hours, the nitrogen content determination corresponded to a conversion of 72%.

Table 2

| Sample according to ex. number | 8 | 9 | 10 | 11 | 12 |
|---|---|---|---|---|---|
| Added starch in % of dry fibre weight | 0.6 | 0.25 | 0.6 | 0.5 | 0.29 |
| pH of the pulp | 7 | 7 | 7 | 7 | 7 |
| Pulp temperature °C | 20 | 20 | 20 | 20 | 20 |
| Cobb number g/m$^2$ | 20.0 | 22.0 | 20.4 | 18.2 | 20.7 |
| Dry tensile strength km | 5.0 | 4.5 | 5.6 | 5.2 | 4.6 |
| Burst factor | 47 | 45.2 | 48 | 47.5 | 46.4 |
| % distearyl carbamoyl chloride based on the amount of starch | 15 | 50 | 15 | 20 | 35 |

EXAMPLE 13a

The preparation procedures of the Examples 8 and 10 were repeated on an enlarged scale, whereby the following amounts were used: 7.5 kg of cationic starch, 1.275 kg of distearyl carbamoyl chloride, 0.225 kg of cetyl chloroformate and 91.0 kg of $H_2O$. Agitation was carried out with an anchor agitator rotating at 200 rpm. Samples were taken after 3 and 5 hours respectively. The nitrogen content determinations corresponded to conversions of 77% and 80% respectively.

EXAMPLE 13b

The process according to Example 13a was repeated in a buffered medium, whereby a conversion of 74% was obtained after 3 hours and a conversion of 76% was obtained after 5 hours.

Table 3

| Sample according to ex. number | 13 a | 13 b |
|---|---|---|
| Added starch in % of dry fibre weight | 0.6 | 0.6 |
| pH of the pulp | 7 | 7 |
| Pulp temperature °C | 20 | 20 |
| Cobb number g/m² | 17.9 | 17.8 |
| Dry tensile strength km | 5.2 | 4.7 |
| Burst factor | 47.6 | 44.7 |
| % distearyl carbamoyl chloride based on the amount of starch | 17 | 17 |

EXAMPLE 14

The preparation procedure of Example 2 was repeated. Instead of the above given amounts of distearyl carbamoyl chloride 1.48 g of dilauryl carbamoyl chloride were added. For a sample taken after 2 hours the nitrogen determination corresponded to a conversion of 74%.

EXAMPLE 15

The preparation procedure of Example 2 was repeated with 4.58 g of methyldecyl carbamoyl chloride. For a sample taken after 2 hours the nitrogen determination corresponded to a conversion of 82%.

EXAMPLE 16

The preparation procedure of Example 2 was repeated with 2.70 g of methyltetradecyl carbamoyl chloride. The nitrogen determination corresponded to a conversion of 74% for a sample taken after 2 hours.

EXAMPLE 17

The preparation procedure of Example 2 was repeated with 2.00 g of methylstearyl carbamoyl chloride. For a sample taken after 2 hours the nitrogen determination corresponded to a conversion of 77%.

Table 4

| pH of the pulp = 7 | | Pulp temperature = 20°C | | |
|---|---|---|---|---|
| Sample according to ex. number | 14 | 15 | 16 | 17 |
| Added starch in % of dry fibre weight | 1.0 | 1.0 | 1.0 | 1.0 |
| Cobb number g/m² | 23.5 | 24.0 | 26.0 | 22.0 |
| Dry tensile strength km | 5.30 | 5.62 | 5.58 | 5.50 |
| Burst factor according to Mullen | 52 | 54 | 56 | 54 |
| % distearyl carbamoyl chloride based on the amount of starch | 12 | 36 | 22 | 16 |

What we claim is:

1. A process for preparing hydrophobic paper products by bringing an aqueous suspension of cellulose fibers or a paper product into contact with a sizing agent and thereafter effecting drying, said sizing agent being a modified starch containing hydrophobic group having the general formula

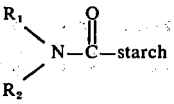

wherein $R_1$ is an organic, hydrophobic hydrocarbon group having 8 to 40 carbon atoms and $R_2$ is either a $C_1$–$C_8$ alkyl group or has the same meaning as $R_1$, said modified starch being prepared by reacting starch with a carbamoyl chloride having substituents $R_1$ and $R_2$ as defined above.

2. A process according to claim 1, characterized in that the organic, hydrophobic hydrocarbon group $R_1$ is an alkyl group having 12 to 30 carbon atoms, and $R_2$ is an alkyl group having 1 to 8 carbon atoms or has the same meaning as $R_1$.

3. A process according to claim 1, characterized in that the modified starch contains 0.05 to 50% by weight of carbamoyl chloride, based on dry starch.

4. A process according to claim 1, characterized in that the modified starch contains 0.05 to 10% by weight of carbamoyl chloride, based on dry starch.

5. A process according to claim 1 characterized in that the modified starch contains 10 to 50% by weight of carbamoyl chloride, based on dry starch.

6. A process according to claim 1 characterized in that the modified starch contains 10 to 30% by weight of carbamoyl chloride, based on dry starch.

7. A process according to claim 1 characterized in that the cellulose fibers or paper product are brought into contact with from about 0.01 to 5% by weight of the modified starch derivative, based on dry fibers.

8. A process according to claim 1 characterized in that the cellulose fibers or paper product are brought into contact with from 0.05 to 2% by weight of the modified starch derivative, based on dry fibers.

* * * * *